US008676990B2

(12) United States Patent
Joyce et al.

(10) Patent No.: US 8,676,990 B2
(45) Date of Patent: Mar. 18, 2014

(54) DEVICE MANAGEMENT

(75) Inventors: Timothy Thomas Joyce, Poole (GB); Nicholas Mark Gyles, Bournemouth (GB)

(73) Assignee: Wireless Data Services Ltd., Poole (GB)

( * ) Notice: Subject to any disclaimer, the term of this patent is extended or adjusted under 35 U.S.C. 154(b) by 551 days.

(21) Appl. No.: 12/870,084

(22) Filed: Aug. 27, 2010

(65) Prior Publication Data
US 2011/0055404 A1  Mar. 3, 2011

(30) Foreign Application Priority Data

Aug. 27, 2009  (GB) .................................. 0914943.6

(51) Int. Cl.
*G06F 15/16*  (2006.01)
*G06F 15/177*  (2006.01)
*H04B 1/38*  (2006.01)

(52) U.S. Cl.
USPC ........... 709/227; 709/221; 709/225; 455/558; 455/435.1

(58) Field of Classification Search
USPC .................. 709/221, 223, 225, 227; 718/102; 705/50; 713/168; 726/7, 12; 455/558, 455/435.1
See application file for complete search history.

(56) References Cited

U.S. PATENT DOCUMENTS

| | | | |
|---|---|---|---|
| 6,351,771 B1 | 2/2002 | Craddock et al. | |
| 7,554,992 B2 * | 6/2009 | Kimura et al. | 370/400 |
| 8,125,894 B2 * | 2/2012 | Van Den Bosch et al. | 370/219 |
| 2003/0200285 A1 * | 10/2003 | Hansen et al. | 709/220 |
| 2005/0153741 A1 * | 7/2005 | Chen et al. | 455/558 |
| 2006/0168178 A1 | 7/2006 | Hwang et al. | |
| 2008/0127190 A1 * | 5/2008 | Shu et al. | 718/102 |
| 2008/0208966 A1 | 8/2008 | Edwards et al. | |
| 2009/0083572 A1 * | 3/2009 | Fukui et al. | 714/2 |
| 2009/0133109 A1 * | 5/2009 | Giles et al. | 726/7 |
| 2010/0262467 A1 * | 10/2010 | Barnhill et al. | 705/10 |
| 2011/0047253 A1 * | 2/2011 | Bhat | 709/221 |
| 2012/0059924 A1 * | 3/2012 | Zhang et al. | 709/223 |

FOREIGN PATENT DOCUMENTS

| | | |
|---|---|---|
| EP | 0973300 A2 | 1/2000 |
| EP | 1528824 A1 | 5/2005 |
| GB | 2349723 A | 11/2000 |
| JP | 2009-193177 A | 8/2009 |

* cited by examiner

*Primary Examiner* — Asghar Bilgrami
(74) *Attorney, Agent, or Firm* — Gordon & Jacobson, PC

(57) ABSTRACT

A method for managing communication in a system having a device in communication with a server via a communication path which includes gateway. A communication session is initiated by transmitting a request signal from the device to the gateway. The signal is then routed through the gateway, and the signal is then transmitted from the gateway to the server.

14 Claims, 5 Drawing Sheets

DEVICE MANAGEMENT

CROSS-REFERENCE TO RELATED APPLICATIONS

This application claims priority from U.K. Patent Application No. 0914943.6, filed Aug. 27, 2009, which is hereby incorporated herein by reference in its entirety.

BACKGROUND OF THE INVENTION

1. Field of the Invention

The present invention relates to a method for managing communication in a system comprising a device, a gateway and a server. In particular in relation to devices in a field in one of the group of cellular telephony, mobile broadband, broadband, WiFi, WiMax, LTE, automotive, cable TV, set top boxes, embedded radio modules, PCs and netbooks and also in the management of other mobile terminals or fixed customer premises equipment (CPE).

2. State of the Art

FIG. 1 illustrates a conventional device 10, provided in communication with a server 20.

At a conceptual level (see FIG. 2), control of the device 10 comprises a number of different levels or tiers of functionality. At a lowest level 12, a user of the device 10 interacts with the device carrying out operations defined by this first level of functionality 12. For example, with a mobile phone, such functionality may include making phone calls, sending text messages and/or saving contacts or calendar data to the device 10.

A second tier of functionality 14 is of a higher level and is typically performed by a "management authority" of the device 10. Functionality such as modifying software on the device 10, configuring connections settings on the device 10 backing up data from the device 10 or immobilizing the device 10 ("lock and kill") are represented in this higher level tier 14. The management authority may be one of the group of a user, network operator, service provider, device manufacturer or employer of the user of the device 10.

This functionality 14 is achieved through communication that uses a management tree structure. A representation of this tree structure can be synchronized between the device 10 and the server 20 through the "SyncML" protocol, with actions such as GET, ADD, UPDATE and DELETE performed on nodes contained within "Management Objects" arranged on the management tree through a "continuous provisioning" method. This is achieved through an HTTP (or HTTPS) session, where XML elements are communicated between the device 10 and the server 20. Additionally alerts may be generated by the device 10 outside of the continuing provisioning session and these may be transmitted by for example, HTTP, HTTPS, SMS.

In order to enable the functionality tier 14 (through Device Management (DM) continuous provisioning), the device 10 must be initialized or otherwise configured to receive such instructions through a "bootstrap" event. The bootstrap event loads relevant network settings onto the device e.g. a server address (URL), network access point, authentication credentials etc. The bootstrap event may be performed, for example, over-the-air (OTA), during manufacture (embedded in a memory of the device), from a SIM (Subscriber Identity Module) or Smart Card.

Standards have been introduced to define mechanisms by which devices can be managed, however, implementation of the, or each, standard is open to interpretation. A primary disadvantage with the aforementioned system is, thus, that the implementation of the device management (DM) standard may be inconsistent between device manufacturers and even devices from the same manufacturer. Consequently, a server vendor must individually test each and every device 10 against its server 20 to achieve a full understanding of the specific tree structure to thereby ensure accurate communication between the device 10 and the server 20 before functionality 14 can be offered. This "interoperability testing" results in a huge burden on the server vendor particularly in fast moving technological fields in which new devices are introduced to the market place very frequently.

Interoperability testing is time consuming and expensive as every combination of device 10 and managing context must be tested. Furthermore, device vendors are generally reluctant to share specific details of the device 10 prior to launch for competitive reasons.

It is, therefore, desirable to enhance a method of controlling devices whereby a consistent interface mechanism is provided and an improved level of control is achieved in order to overcome some of the aforementioned disadvantages.

SUMMARY OF THE INVENTION

According to a first aspect, the present invention provides a method for managing communication in a system comprising a device in communication with a server via a communication path, wherein the communication path comprises a gateway, the method comprising the following steps:

initiating a communication session by transmitting a request signal from the device to the gateway;

routing the signal through the gateway; and transmitting the signal from the gateway to the server.

By providing a method whereby signals initiated from a device are routed through a gateway before being transmitted to a server of a system, additional flexibility is gained to enable versatile functionality to be introduced into the management of the communication within the system. For example, delegation of certain tasks to be performed on the device by different servers can be achieved, the burden of interoperability testing can be significantly reduced and servers and/or service providers can be changed without disruption to a user of the device.

The system may comprise a second server and a repository, the repository may be configured to be accessed by the gateway and the method may further comprise the steps of identifying data within the request signal, indicative of a type of the device; interrogating the repository to determine a server to which the request signal is to be routed. The transmitting step may comprise transmitting the signal to the determined server, dependent on the interrogating step.

The repository may be a local repository, located within the gateway. The contents of the repository may be altered to enable a change in criteria upon which the determination of the interrogating step is based.

The routing step may comprise the steps of receiving a request signal at the gateway from the device, translating the request signal to be compatible with the server and transmitting the request signal to the server.

The method may comprise the steps of receiving a response signal at the gateway from the server, translating the response signal to be compatible with the device and transmitting the response signal to the device.

The gateway may prompt the device for information relating to a functionality of the device and the determination of the interrogating step may be additionally dependent upon a response of the device to said prompt.

According to a second aspect, the present invention provides a gateway apparatus located in a communication path between a device and a server, the apparatus comprising:

a first input channel for receiving a request signal from a device to be controlled;

a first output channel for transmitting the request signal to a server configured to control the device;

means for interrogating the request signal;

a second input channel for receiving a response signal from the server; and a second output channel for transmitting the response signal to the device, wherein the interrogation means is configured to determine a route of the, or each, signal dependant on a content of the request signal.

The interrogation means may comprise a repository configured to store data relating to routing of the, or each, signal. The repository may be integral with the gateway.

According to a third aspect, the present invention provides a system comprising:

a device;

a server; and a communication path extending between the device and the server, the path comprising gateway apparatus of the aforementioned type.

The present invention will now be described in more detail, by way of example only, with reference the accompanying drawings. Additional objects and advantages of the invention will become apparent to those skilled in the art upon reference to the detailed description taken in conjunction with the provided figures.

DETAILED DESCRIPTION OF THE PREFERRED EMBODIMENTS

Figure 3:
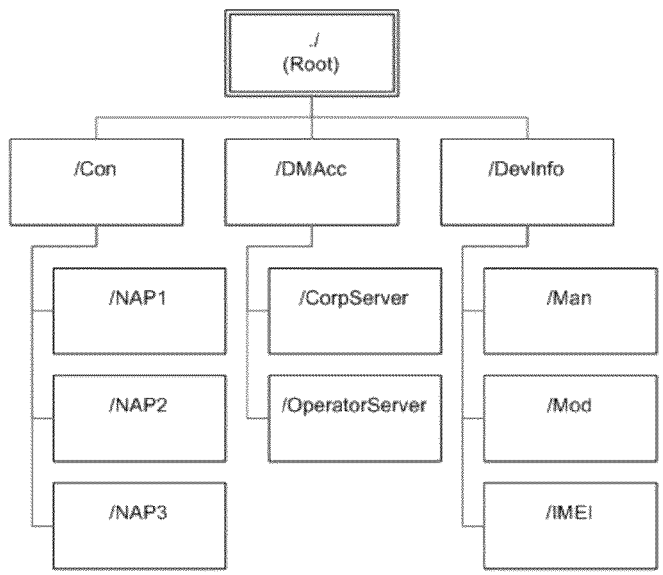
FIG. 3 illustrates a schematic representation of a management tree structure.

A management tree structure, e.g. as shown in FIG. 3, is used for communication and management activity between a server and a device. Such a management tree comprises a number of management objects each set up to act on particular functions of the device. By synchronising a representation of this tree on each of the device and the server, the objects on the management tree are changed, or read, through a continuous provisioning method. Thus, the device can be manipulated by a management authority (having control over the management objects). In order to establish "continuous provisioning" as discussed above, the device must be configured using a bootstrap event.

Multiple instances of each management object may exist within the hierarchy of the management tree. In the example illustrated in FIG. 3, the boxes represent instances of management objects. For example:

under/con are three instances of 'connection' management objects defining data connection parameters;

under/DMAcc are two instances of Device Management server accounts, one for a corporate server (CorpServer) and one for a network operator server (OperatorServer).

Within each management object are one or more nodes, each containing data parameters.

Figure 4:
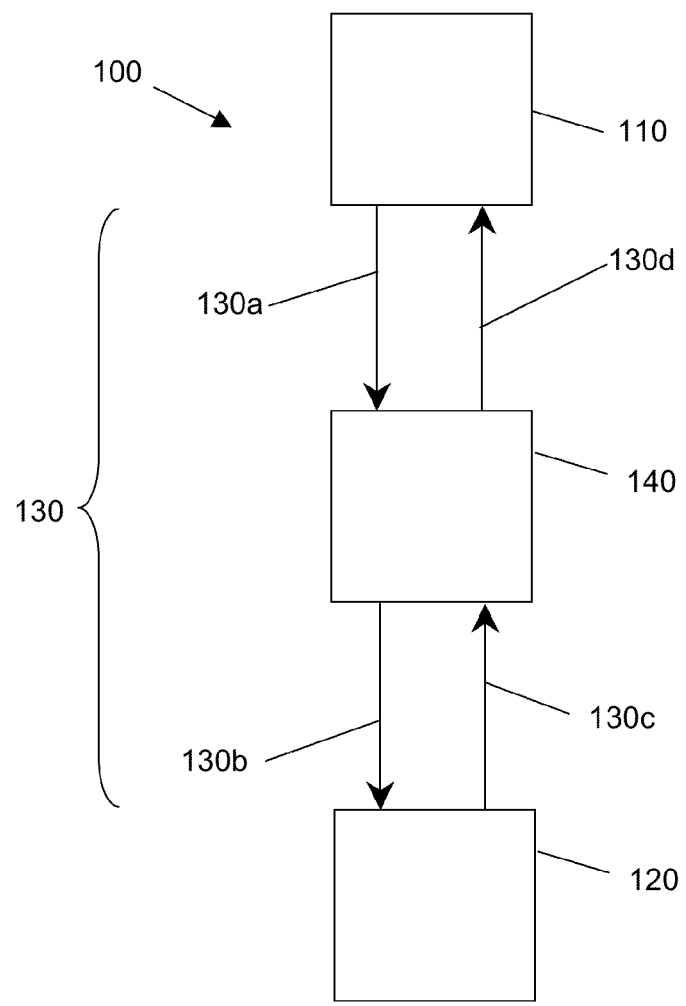
FIG. 4 illustrates a schematic representation of a device controller comprising a gateway in a first "pass-through" embodiment.

FIG. 4 illustrates a first "pass-through" embodiment, in which a system 100 comprising a number of mobile terminal devices 110 is shown. The devices 110 are connected to a device management server 120 via a communication path 130. A device management gateway 140 is provided in the communication path 130 such that request signals transmitted by each device 110 are received by the gateway 140 and, subsequently, delivered to the server 120. Conversely, instructions or response signals transmitted by the server 120 are received by the gateway 140 and are, subsequently, delivered to the device 110. In particular, a device 110 initiates a session and transmits a request signal along a first communication path 130a to the gateway 140. The gateway 140 forwards the request along a second communication path 130b to the server 120. The server 120 sends a response to the gateway 140 along a third communication path 130c. Finally, the gateway 140 returns this response signal to the device 110 along a fourth communication path 130d.

By providing an interruption in the communication path 130 in this way, it is possible for the server 120 to be replaced during the lifetime of the device 110 without causing disruption to an end user of the device 110. This may be desirable either for update purposes or to redirect to a different management authority or server.

Figure 5:
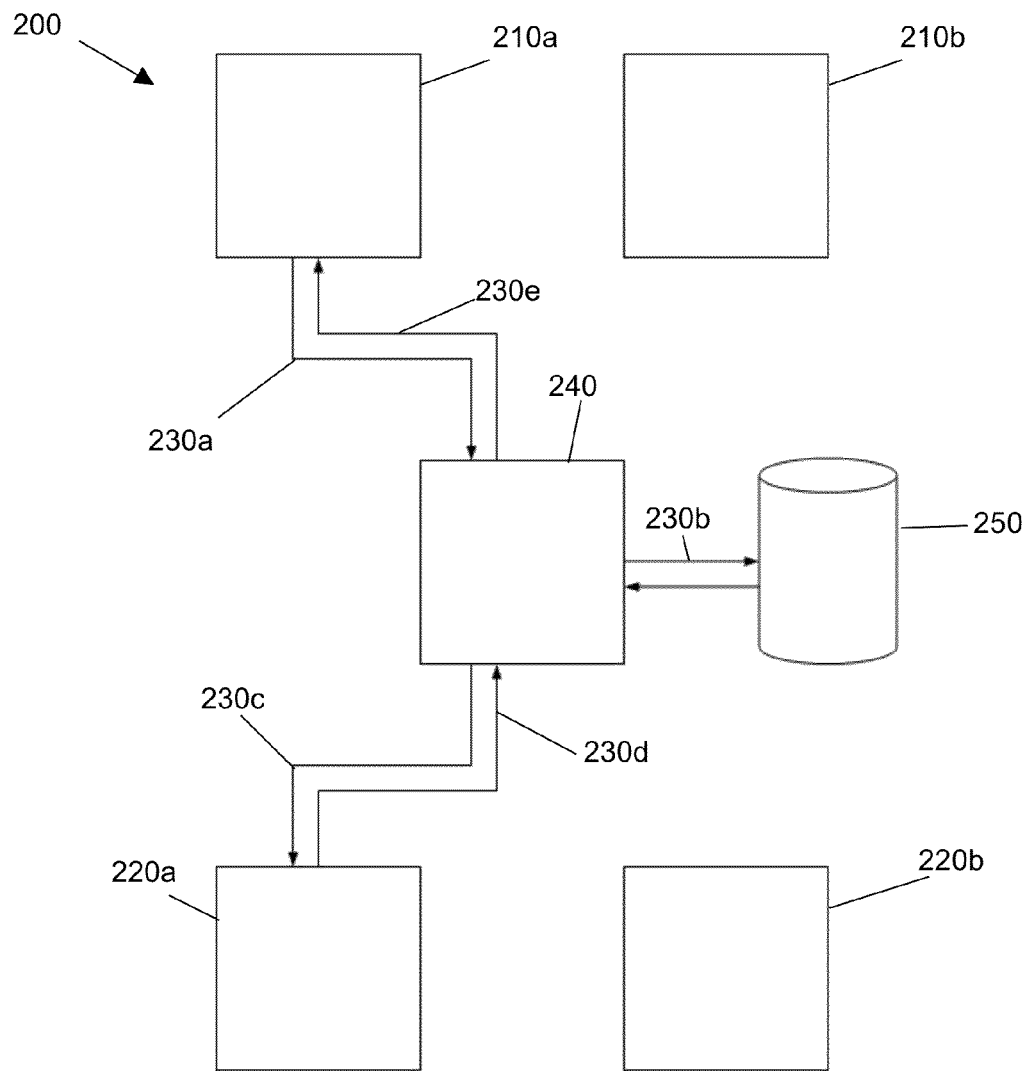
FIG. 5 illustrates a schematic representation of a device controller comprising a gateway in a second "routing" embodiment.

In a second "routing" embodiment, illustrated in FIG. 5, a system 200 comprises a number of devices, two 210a, 210b are represented in this example. The devices 210a, 210b are connected to a number of servers 220a, 220b via a communication path 230. In this example, the devices 210a, 210b may be supplied by separate vendors, say X and Y respectively. The device type can be identified through one of a number of standard reference schemes, e.g. the International Mobile Equipment Identifier (IMEI) scheme or the Open Mobile Alliance (OMA) device management (DM)/DevInfo management object. A single gateway 240, capable of communicating with a number of devices 210a 210b and a number of servers 220a, 220b is provided in the communication path 230 and comprises a local repository 250. The repository 250 serves to store and access information enabling a particular type of device 210a, 210b to be mapped to a particular management authority. For example, devices 210a, supplied by vendor X, may be managed by server 220a whilst those devices 210b, supplied by vendor Y, may be managed by server 220b. The repository 250 may be integrated with the gateway 240 or it may be separately located and remotely accessed e.g. via a network.

In operation, a device 210a may initiate a session and transmit a request signal accordingly along a first communication path 230a, which is, in turn, received by the gateway 240. The gateway 240 identifies the type of device e.g. through the IMEI) and refers to the local repository 250 via a second communication path 230b to ascertain the appropriate server 220a, 220b to which the request signal ought to be routed towards. The gateway 240 then transmits the request signal along a third appropriately routed communication path 230c to be received by the identified server 220a. A response signal is, subsequently, transmitted from the server 220*a* along a fourth communication path 240*d* towards the gateway 240. The signal is then routed along a fifth communication path 230*e* by the gateway 240 to the appropriate device 210*a* based on a session identifier established at the outset.

It is generally the device 210 that initiates a session and sends a request signal to the server 220. However, it may be that the server 220, rather than the device 210, has cause for communication to be initiated. In this instance, the server 220 prompts the device 210 to initiate the session and establish the route (using a session identifier) between the device 210 and the server 220 for that particular session.

In some circumstances, it may be desirable to split management authority between multiple servers 220 using the gateway 240, with a single DM account bootstrapped onto the device 210. For example, a service provider may appreciate some ability to control/determine which organisation was authorised to directly manage the device 210. In particular, as the service provider is responsible for providing an ongoing access subscription to the customer and for supporting that subscription, they may wish to fully control the customer experience e.g. ensuring that the brand of the service provider is displayed on the device and offering new features to the customer in a consistent way. However, the service provider may prefer to delegate the general role of "management authority" to the vendor for a given set of devices or to a corporation (or employer of the user) for specific management objects whilst retaining others for themselves. In so doing the service provider is more likely to be able to retain customer ownership.

In addition, the service provider is able to change management authority in the future should they wish to resume control of a previously-delegated management object.

Such delegation tasks are effected by the content of the local repository 250. The local repository 250 is preferably a dynamic facility, able to be reprogrammed as necessary to reflect different routing preferences.

Figure 1:
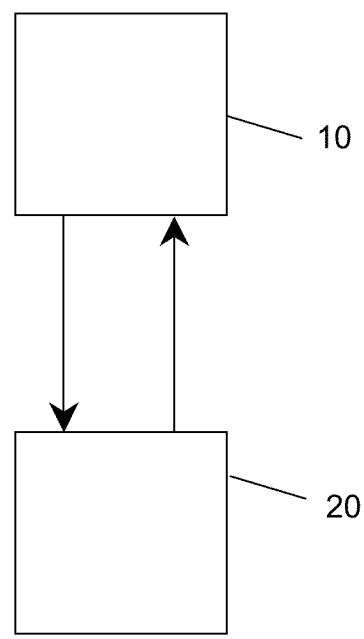
FIG. 1 illustrates a schematic representation of a conventional device controller.
Figure 2:
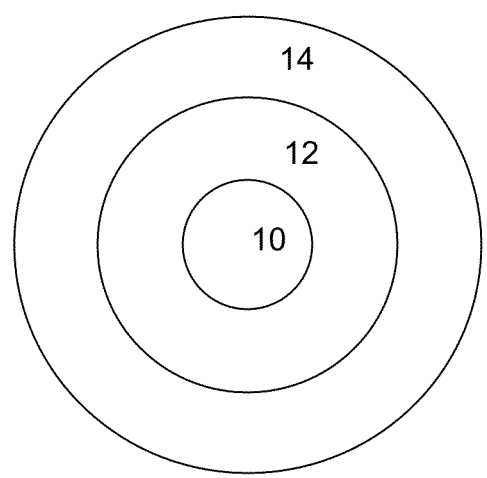
FIG. 2 illustrates a schematic representation of functionality required by a device.

A server may be granted access to a sub-section of the management tree and, hence, the second tier of functionality 14 (from FIG. 2) may be split based on access control to the management tree on the device 210 as defined by the device management standard. However in this instance the network operator or service provider would not necessarily have visibility of management objects performed by the delegated server.

A third embodiment represents a more sophisticated version of the second "routing" embodiment. In the third embodiment, a "delegating" mode, not only is the type of device 210*a* identified but also the specific device 2101, 2102, 2103 etc. For example, specific devices, say 2102, 2103, may belong to employees of Company P. Certain functionality may have been delegated from the service provider directly to Company P. In other words, Company P may serve as the management authority for devices used by their employees for a particular management object, such as the email settings object. Consequently, the gateway 240 is configured to process signals received from associated devices 2102, 2103 and route these directly to an appropriate server 220*p*, managed directly by Company P for certain management activities.

The gateway 240 may inject additional commands into the management session, such as a 'DM Prompt', to discover which function of the device is to be managed. The gateway 240 then routes the request signal to an appropriate server 220*p* according to the response received.

Commands of this type are, preferably, presented to a user of the device 210 by the gateway 240 using a user interface screen. A mobile device 210 user interface screen may offer a number of options to a user of the device 210 using a device management menu, for example:—
  1. configure network settings
  2. check for new firmware
  3. set up e-mail
  4. configure virtual private network (VPN)

Options 1 and 2 would route the management session to a device management server 220*n* associated with the network operator. Meanwhile options 3 and 4 would route the management session to the device management server 220*p* managed by (and/or owned by) Company P. The relevant option is chosen by the user and input on the mobile device 210 as a request signal. The request signal is transmitted back to the gateway 240 via communication path 230*a* and subsequently interpreted by the gateway 240.

Figure 6:
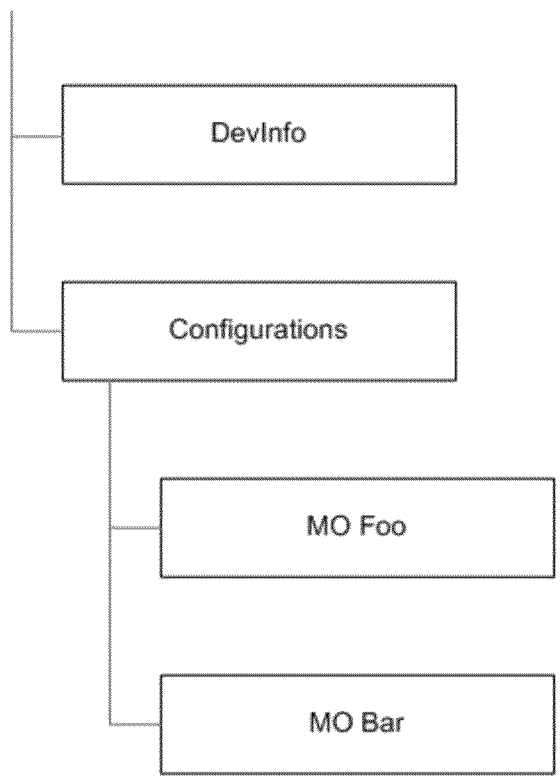
FIG. 6 illustrates a schematic representation of management objects within a management tree structure.

Meanwhile, the service provider may opt to retain some of the functionality under its direct control and delegate management of other management objects to alternate management authorities. The structure of such delegation choices are effected through the content of the local repository 250 an example of which is illustrated in FIG. 6. At a high level, certain management objects e.g. DevInfo are available to all servers. The service provider may wish to retain control of other nodes e.g. Configurations. In particular, a first management object, a connection management object called "MO Foo" may be accessible only to a first server. In this example "MO Foo" defines a network access point, on the service provider's network, to be used by the device 210 to establish a TCP/IP connection, consequently it is only accessible to a server 220*n*, associated with the service provider. In contrast, management of the object "MO Bar", which represents a connection to the corporation's network is delegated to Company P and, therefore, is only accessible to the server 220*p* associated with Company P.

Over time, it may be desirable to make changes in the delegation of roles. By providing a device management gateway 240 with its associated functionality, such changes can be performed in a seamless manner without disrupting the user of the device 210. As discussed above, any such changes are effected by reprogramming the local repository 250. Thus the local repository 250 becomes a flexible dynamic facility.

Figure 7:
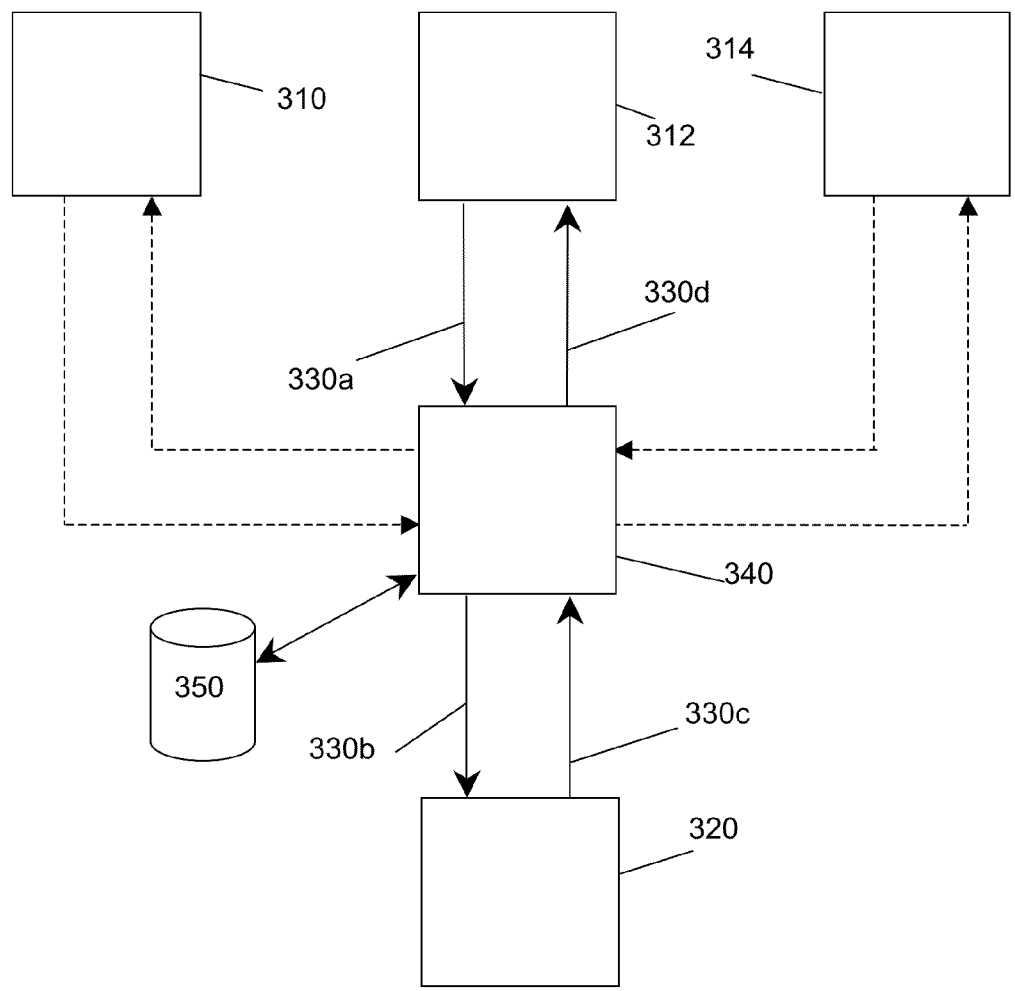
FIG. 7 illustrates a schematic representation of a device controller comprising a gateway in a fourth "transcoding" embodiment.

A fourth embodiment represents a "transcoding" mode, illustrated in FIG. 7. Devices 310, 312, 314, of differing types, are each connected to a server 320 via a communication path 330. A gateway 340 is provided in the communication path 330 to facilitate communication between each device 310, 312, 314 and the server 320.

The gateway 340 effectively performs a translation function allowing each device 310, 312, 314 to interoperate with the server 320 by representing each device by a standard management tree. Thus a profile is established for each device. The translation function is effected by modelling held within a repository 350, represented in FIG. 7 as a remotely located repository. In this way, any instructions received from the server 320 to act on a particular node in the standard management tree are interpreted by the gateway 340 into an instruction to act on the appropriate node on the, or each, device 310, 312, 314. The interpretation is effected by identifying the device 310, 312, 314 through the profile and accessing the functionality of the repository 350 either through modelling or by using a look up table contained therewithin. This interpretation takes into account any differences in management object name, node structure or command sequence so that the desired change can readily be applied to the management tree.

All devices 310, 312, 314 would, therefore, need to be bootstrapped to connect to the gateway 340 rather than to the server 320 directly. In so doing, the server 320 need only communicate with a standard interface at the gateway 340. By providing this standard interface, the server 320 is able to communicate with the gateway 340 and, ultimately, with the devices 310, 312, 314 using a standard management tree structure and command sequence.

Thus the burden of interoperability testing is shifted from one or more server providers to the gateway provider. However, as each new device need only be tested in relation to a single standard gateway rather than by each server vendor, the burden, itself, is significantly reduced.

In operation, an active device (in this example mobile terminal device 312) initiates a session and transmits a request signal along a first communication path 330*a* to the device management gateway 340. The device management gateway 340 forwards and translates the request signal on to the device management server 320 using a second communication path 330*b*. The server transmits a response that is conveyed along a third communication path 330*c* to the gateway 340. The response may include a command directed towards the device 312 e.g. "... UPDATE./FW/Ver...". The gateway 340 receives and modifies the command to be compatible with the intended device 312 e.g. "... UPDATE./FUMO/Version...". The response, comprising the modified command, is then forwarded to the device 312 along a fourth communication path 330*d* by the gateway 340.

The session may continue with ongoing modification to node addresses, values and optionally the command sequencing in either a synchronous or asynchronous manner.

In each embodiment, the gateway 140, 240, 340 manages the session and security mechanisms, such as a corresponding NONCE, with the device to ensure continuous provisioning is maintained.

Communication between the device, the gateway and the server is, preferably, performed using SyncML protocol. The gateway is able to inspect, interpret and act on data held in the SyncML commands. The gateway 140, 240, 340 may record/log the SyncML session activity to thus provide a means of reporting all management activity for a single device, or across a population of devices. Such a reporting facility can be useful for the service provider.

In summary, the introduction of a gateway 140, 240, 340 between the device and the server enables the network operator or service provider to fully manage the customer experience by retaining full control of device management for the population of devices whilst maintaining an ability to replace management authorities during the lifetime of the device as necessary while maintaining a means of reporting all management activity.

The service provider is able to direct management authority to alternative servers based on the device type, thus allowing delegation of management of each device type in the network to the device vendor or other organisation.

Furthermore, the service provider is able to delegate management of various management objects within the tree to alternate management authorities.

In addition, the gateway 140, 240, 340 may intercept and forward other communication between the device and the server outside of the continuous provisioning session. This could include 1200 messages and 1201 alerts, such as notification of incorrect PIN entry by the user.

What is claimed is:

1. In a system having devices in communication with one of a plurality of servers via a communication path which includes a gateway and also having a repository, a method for managing the devices comprising:

configuring the plurality of servers to store management objects for use in configuring certain device types;

configuring the repository to be accessed by the gateway and store information that associates device types with corresponding servers of said plurality of servers; and initiating a communication session for configuring a device in accordance with the at least one management object stored on a particular server of said plurality of servers by transmitting a request signal from the device to the gateway, routing the signal through the gateway, and transmitting the signal from the gateway to said particular server as determined by the access to the information stored in the repository;

wherein the request signal is indicative of a device type and the information stored by the repository is accessed by the gateway in order to determine which of said plurality of servers to which the request signal is to be transmitted; and wherein the information stored in the repository is altered to enable a change in criteria upon which the determination of which of said plurality of servers to which the request signal is to be transmitted is based.

2. A method according to claim 1, wherein:

the repository is a local repository located within the gateway.

3. A method according to claim 1, wherein:

routing the signal through the gateway includes receiving the request signal at the gateway from the device and translating the request signal to be compatible with said particular server.

4. A method according to claim 1, further comprising:

receiving a response signal at the gateway from said particular server;

translating the response signal to be compatible with the device; and transmitting the response signal to the device.

5. A method according to claim 1, wherein:

the gateway prompts the device for information relating to a functionality of the device, and wherein the determination of which of said plurality of servers to which the request signal is to be transmitted is dependent upon a response of the device.

6. An apparatus for use in a communication path between devices to be managed and a plurality of servers that store management objects for use in configuring the devices, the apparatus comprising:

a repository configured to store information that associates device types with corresponding servers of said plurality of servers; and a gateway, operably coupled to the repository, that is configured to receive a request signal from a device, transmit the request signal to a particular server of said plurality of servers as determined by the access to the information stored in the repository, receive a response signal from the particular server, and transmit the response signal to the device;

wherein the request signal is indicative of a device type and the information stored by the repository is accessed by the gateway in order to determine to which of the plurality of servers the request signal is to be transmitted; and wherein the repository is configured to alter the information stored in the repository to enable a change in criteria upon which the determination of which of said plurality of servers to which the request signal is to be transmitted is based.

7. An apparatus according to claim 6, wherein:
the repository is integral with the gateway.

8. A system comprising:
a device;
a plurality of servers that store management objects for use in configuring devices of different device types; and
a communication path extending between the device and the plurality of servers, the path comprising an apparatus according to claim 6.

9. A method according to claim 1, wherein:
the at least one management object comprises an object configured to act on particular functions of the device.

10. A method according to claim 1, wherein:
the at least one management object is part of a management tree structure that is synchronized between the device and the first server via the communication session.

11. A gateway system operably coupled between a plurality of devices and a plurality of management servers that store management objects for configuring the plurality of devices, the gateway system comprising:
a repository that stores information that associates certain management servers with at least one of certain device types, certain devices or groups of devices and certain management objects; and
a gateway apparatus that is operably coupled to the repository, wherein the gateway apparatus is configured to receive and process request signals transmitted from the plurality of devices to the gateway apparatus;
wherein the gateway apparatus processes a respective request signal transmitted by a given device by (i) identifying data within the respective request signal, the data indicative of at least one a specific device type, a specific device or group of devices, and a particular management object for the given device, (ii) accessing the information stored in the repository to determine which particular management server of said plurality of management servers corresponds to the identified data of the respective request signal, and (iii) routing the respective request signal to the particular management server for configuring the given device; and
wherein the repository is configured to alter the information stored in the repository to enable a change in criteria upon which the determination of correspondence between the identified data of the respective request and the particular management server is based.

12. A gateway system according to claim 11, wherein:
the information stored in the repository allows the gateway apparatus to delegate configuration of the plurality of devices amongst the plurality of management servers according to specific device type.

13. A gateway system according to claim 11, wherein:
the information stored in the repository allows the gateway apparatus to delegate configuration of the plurality of devices amongst the plurality of management servers according to specific devices or groups of devices.

14. A gateway system according to claim 11, wherein:
the information stored in the repository allows the gateway apparatus to delegate configuration of the plurality of devices amongst the plurality of management servers according to specific management objects.

* * * * *